United States Patent [19]

Freeman

[11] Patent Number: 5,000,990
[45] Date of Patent: Mar. 19, 1991

[54] ONE PIECE MOLDED COMPOSITE PART AND METHOD OF MANUFACTURE

[75] Inventor: Richard B. Freeman, Oxford, Mich.

[73] Assignee: The Budd Company, Troy, Mich.

[21] Appl. No.: 257,996

[22] Filed: Oct. 14, 1988

Related U.S. Application Data

[63] Continuation-in-part of Ser. No. 768,259, Aug. 22, 1985, abandoned, Ser. No. 136,187, Dec. 21, 1987, Pat. No. 4,863,771, and Ser. No. 190,055, May 4, 1988, Pat. No. 4,849,147.

[51] Int. Cl.[5] ............... B29C 45/14; B29C 51/00; B29D 22/00; B32B 1/08
[52] U.S. Cl. ............... 428/36.1; 29/460; 29/527.2; 29/527.3; 29/557; 49/502; 264/138; 264/258; 264/296; 264/314; 264/512; 296/146; 296/901
[58] Field of Search ............... 264/138, 163, 258, 314, 264/294, 296, 511, 512, 513; 29/458, 460, 469, 469.5, 525, 527.2, 527.3, 557; 49/502; 296/146, 901; 428/36.1, 137

[56] References Cited

U.S. PATENT DOCUMENTS

| | | | |
|---|---|---|---|
| Re. 25,241 | 9/1962 | Randolph | 264/258 |
| 2,859,936 | 11/1958 | Warnken | 416/225 |
| 3,128,322 | 4/1964 | Young | 264/314 |
| 3,135,640 | 6/1964 | Kepka et al. | 264/314 X |
| 3,309,450 | 3/1967 | Rodgers | 264/257 |
| 3,340,119 | 9/1967 | Wiltshire et al. | 156/218 |
| 3,832,109 | 8/1974 | Ranallo et al. | 264/314 X |
| 3,937,781 | 2/1976 | Allen | 264/314 |
| 3,967,996 | 7/1976 | Kamov et al. | 264/258 X |
| 4,126,659 | 11/1978 | Blad | 264/314 X |
| 4,202,856 | 5/1980 | Frikken et al. | 264/258 X |
| 4,209,482 | 6/1980 | Schwarz | 264/135 |
| 4,306,381 | 12/1981 | Presto | 49/502 |
| 4,314,964 | 2/1982 | Ferrary | 264/513 X |
| 4,338,070 | 7/1982 | Nava | 425/112 |
| 4,418,031 | 11/1983 | Doerer et al. | 264/241 |
| 4,446,092 | 5/1984 | Bliley | 264/258 |
| 4,483,731 | 11/1984 | Dohle et al. | 264/314 X |
| 4,651,470 | 3/1987 | Imura et al. | 49/502 |
| 4,705,716 | 11/1987 | Tang | 296/901 |
| 4,740,346 | 4/1988 | Freeman | 264/258 |
| 4,762,740 | 8/1988 | Johnson et al. | 428/68 |
| 4,769,951 | 9/1988 | Kaaden | 49/502 |
| 4,849,147 | 7/1989 | Freeman | 264/138 |
| 4,863,771 | 9/1989 | Freeman | 428/36.1 |

OTHER PUBLICATIONS

U.S. patent application Ser. No. 07/061,508, filed on Jun. 15, 1987.

Primary Examiner—Jeffery Thurlow
Assistant Examiner—Leo B. Tentoni
Attorney, Agent, or Firm—Harness, Dickey & Pierce

[57] ABSTRACT

A hollow fiber reinforced part, especially body closures for vehicles, is made by applying preforms to a hollow, thin-walled support which has been preshaped to the general configuration of the body closure. The support is then depressurized and the support/preform subassembly placed into a mold. The mold is closed and the support again pressurized. Then, resin is injected into the mold to impregnate the fibrous pieces of the preforms. Once the resin cures, the mold is opened and the part removed.

12 Claims, 3 Drawing Sheets

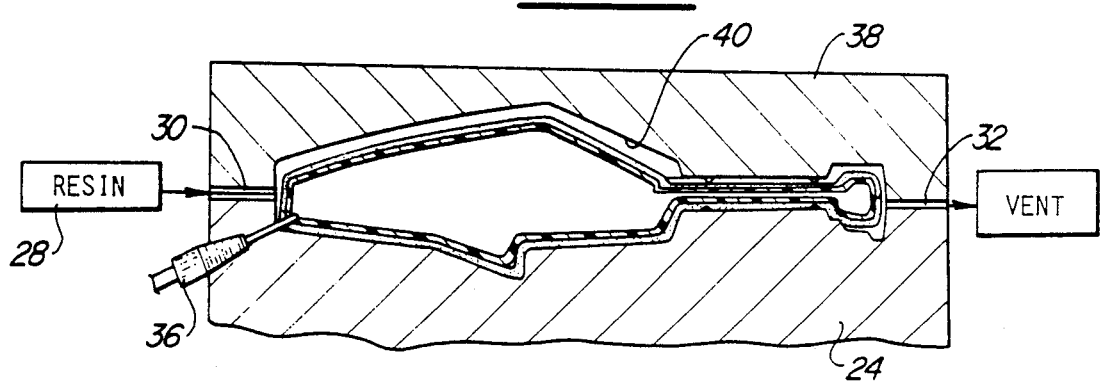
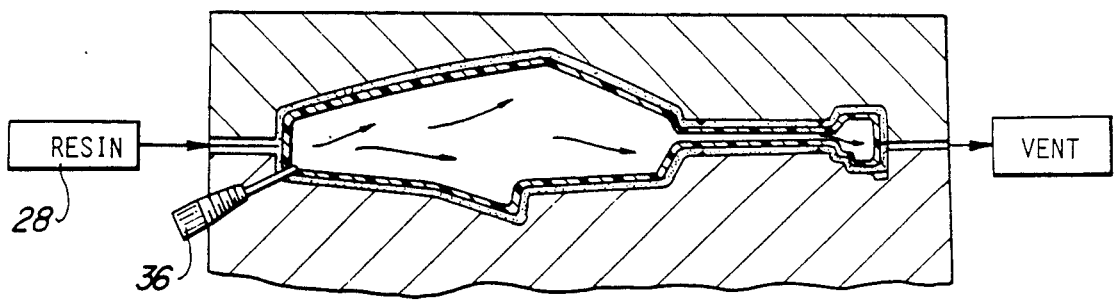
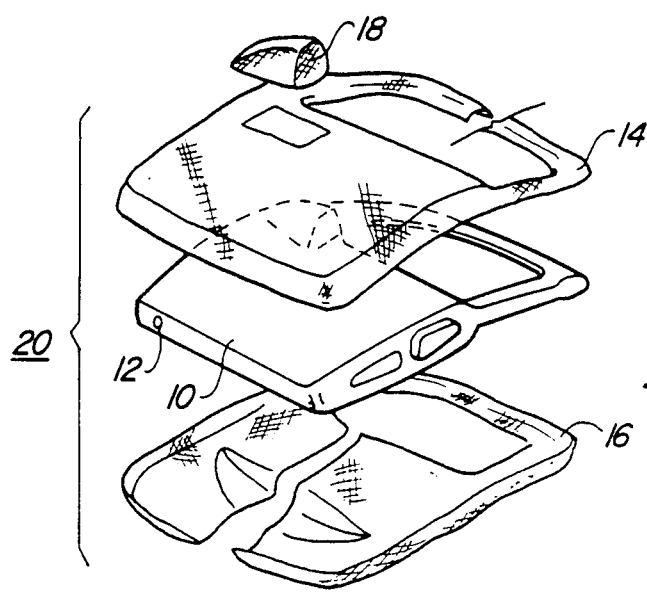

ONE PIECE MOLDED COMPOSITE PART AND METHOD OF MANUFACTURE

CROSS REFERENCE TO RELATED APPLICATIONS

This application is a continuation-in-part application of U.S. Ser. No. 768,259, filed Aug. 22, 1985 now abandoned; U.S. Ser. No. 136,187, filed Dec. 21, 1987 (now U.S. Pat. No. 4,863,771) and U.S. Ser. No. 190,055, filed May 4, 1988 (now U.S. Pat. No. 4,849,147).

BACKGROUND OF THE INVENTION

1. Technical Field

This invention relates to fiber reinforced plastic parts and, more particularly, to techniques for forming hollow, lightweight parts with complex shapes.

2. Discussion

The present invention is particularly well suited for making vehicle body closures such as doors, lift gates, deck lids, and hoods. Most typically, automotive body closures are now fabricated from separate outer and inner panels made of metal. These panels are joined together with a combination of welding, hem flanging, mechanical fastening and bonding. The joining operation generally requires expensive fixturing to accurately join the inner and outer panels in addition to the need for two tool and die sets to make the panels themselves. It has been recognized that some advantages can be obtained by making the outer panel from fiber reinforced plastic. However, there still generally must be another joining process to assemble the outer panel to the inner panel, trim panel and separate mirror stalk.

It is, of course, necessary to maintain a smooth, aesthetically pleasing appearance for the outer surface of the outer panel. This is generally known as the "Class A" surface in the trade. The use of welding to join together the various parts can damage the Class A surface. Rigid adhesives, can also cause problems with "read through" of the bond line, if such adhesives are used as alternatives to welding. Unless the inner and outer panels are rigidly joined they do not work well together in carrying loads thereby resulting in an unacceptable structure.

Still other problems with the typical method of manufacturing vehicle body closures is the number of panels and parts that must be manufactured. Multiple pieces lead to assembly variation, productivity losses and quality-control problems.

Commonly assigned U.S. patent application Ser. Nos. 768,259, filed Aug. 22, 1985 (now abandoned); 136,187, filed Dec. 21, 1987 (now U.S. Pat. No. 4,863,771); 833,304, filed Feb. 26, 1986 now U.S. Pat. No. 4,740,346; and 190,055, filed May 4, 1988 (now U.S. Pat. No. 4,849,147) disclose various methods of forming hollow fiber reinforced plastic structures. These applications generally disclose, in at least one embodiment, the use of an inflatable bladder that can be pressurized to define the hollow interior of the part when resin is injected into the mold. The bladder can be envisioned as a type of balloon. It is not self-supporting unless it is pressurized. In accordance with the disclosures in these applications, fibrous pieces are first laid in one surface of the open mold and then the bladder is placed on these pieces. Then, the fibrous pieces for the top of the part are laid over the bladder. The mold is closed and then the bladder is pressurized during the resin injection step. While this method has provided satisfactory results, it does have some drawbacks. For example, problems are sometimes encountered because the balloon-like bladder does not completely expand as anticipated when pressurized thereby incompletely defining the interior of portions of the part. The mold loading procedure was somewhat awkward in that most operations are performed at the mold site. In addition, the fibrous pieces on the top of the bladder have a tendency to sag downward thereby causing some unwanted shifting thereof until the mold is closed and the bladder later pressurized.

SUMMARY OF THE INVENTION

In accordance with the teachings of the preferred embodiment of the invention, a thin hollow support is provided in the general shape of the desired part. The support has sufficient rigidity to substantially maintain its shape, at least in its unloaded state. Preforms of fibrous pieces are attached to the support to form a subassembly using, for example, hot melt adhesive to secure the preforms to the support. The subassembly is then placed into the mold which is then closed. Thereafter, resin is injected into the mold to impregnate the fibrous pieces. After the resin is cured, the part is removed from the mold and trimmed as necessary to provide a one-piece hollow part, preferably a closure for a vehicle.

BRIEF DESCRIPTION OF THE DRAWINGS

The various advantages of the present invention will become apparent to those skilled in the art after a study of the following specification and by reference to the drawings in which:

FIG. 4 is an exploded perspective view of a preform/support subassembly;

FIG. 5 is a cross-sectional view of the subassembly in the mold before resin injection and pressurizing of the support;

FIG. 6 is a view similar to FIG. 5 except that the resin has been injected and the support repressurized.

DESCRIPTION OF THE PREFERRED EMBODIMENT

This invention will be described in connection with making a one-piece door for an automotive vehicle. However, it should be understood that while this invention is particularly advantageous for use in making vehicle body closure parts, it has broader applicability.

Figure 3:
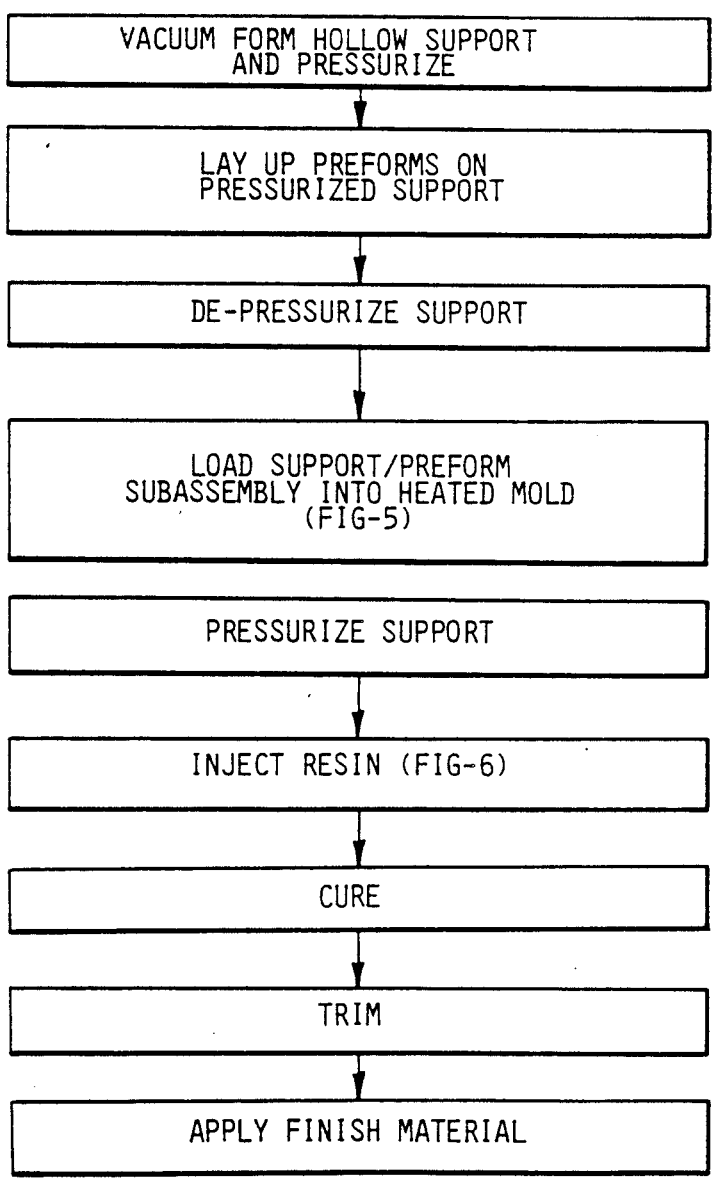
FIG. 3 is a flow chart illustrating the sequence of steps in the method of the preferred embodiment.

With that caveat in mind, the reader's attention is initially drawn to FIGS. 3 and 4. A thin, hollow support 10 is provided with a shape that generally corresponds to the shape of the desired part, here an automobile door. Support 10 is sufficiently rigid to substantially maintain its shape, at least when it is not loaded; i.e., not carrying external material such as the preforms to be described. On the other hand, it should be inexpensive to make, lightweight and essentially fluid tight. In the preferred embodiment, support 10 is preferably vacuum formed from dual sheets of suitable thermoplastic material such as polyethylene, acrylonitrile butadiene styrene (ABS) or polyvinyl chloride (PVC) sheets approximately 0.010 to 0.030 inch thick. The support could alternatively be thermoformed, blow molded or rotomolded. One can envision the support 10 as being along the lines of a plastic milk jug in common use today. It is sufficiently rigid so that maintains its shape yet it can be deformed slightly if its interior is evacuated or when it is loaded with preforms of sufficient weight and can expand back to its original shape if pressurized.

The next generally step as illustrated in FIG. 3 is to lay up glass fiber preforms on the pressurized support 10. It may be necessary to provide slight pressure (½ to 1 psi) to the support to prevent it from collapsing when the preforms are pressed on. Accordingly, support 10 is provided with a suitable opening 12 that is engageable with a nozzle which is in turn connected through a hose or the like to a pressurized air source. As noted, this pressurizing step may or may not be necessary depending upon the weight of the preforms. Three such preforms 14, 16 and 18 are illustrated in FIG. 4. The preforms are relatively large and, thus, could otherwise deform the thin support 10 unless it is pressurized. Each preform is formed of one or more pieces of fiber mat material which are temporarily held together in the desired shape by suitable adhesives such as a hot melt adhesive or a contact adhesive. Preform 14 generally defines the outer panel for the door whereas preform 16 generally defines the inner panel for the door. Preform 18 defines a mirror stalk for the door. The support 10 acts as a guide to the operator in that it aids in visualizing where the preforms should be located since the support 10 is also in the general shape of the desired part. While the preforms can be attached in a variety of ways, one preferable method is to first apply spots of hot melt adhesive to the support 10 and then press the preforms onto the support, with the adhesive serving to hold the preforms in place.

Figure 7:
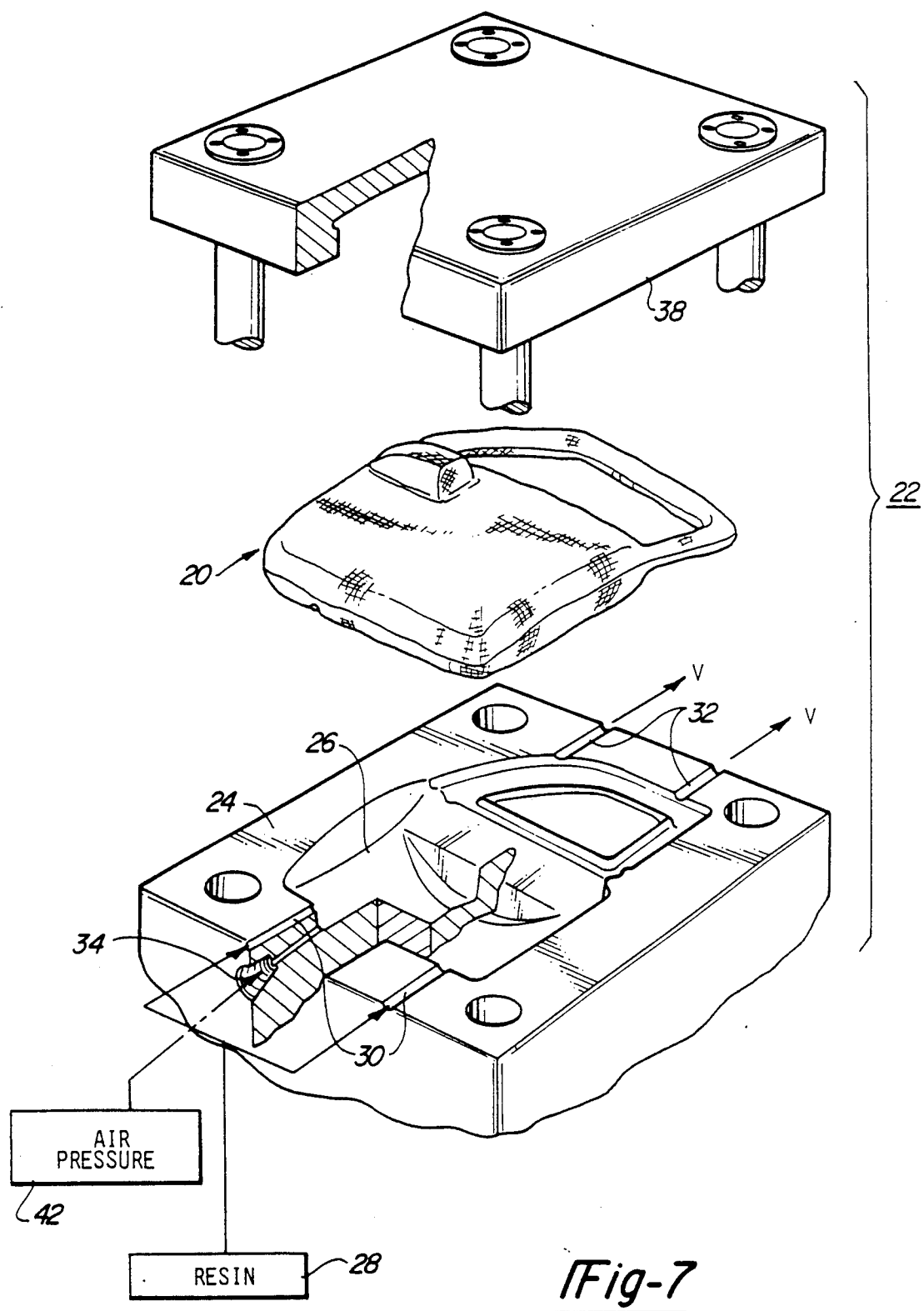
FIG. 7 is an exploded perspective view of the mold and preform/support subassembly.

Turning now to FIG. 7, the support/preform subassembly 20 forms a one-piece unit that can be made at any convenient location, stored and later transported for insertion into the mold 22 when desired. Mold 22 contains a lower die 24 having a mold cavity 26 in the desired shape of the inner panel. Provision is also made for introducing resin into the mold 22 when closed, for venting air and the resin, and for pressurizing the support 10. As illustrated in FIGS. 6 and 7, a source 28 of resin is connected to grooves 30 formed in the upper surface of die 24. Vent grooves 32 are also provided that communicate with the cavity 26. An orifice 34 provides room for a suitable nozzle 36.

The subassembly 20 is laid in the mold cavity 26 and the upper die 38 is closed as illustrated in FIG. 5. Pressure is not introduced to support 10 until the upper die 38 is closed. The thin support, being loaded with the somewhat heavy preforms, deforms somewhat thereby shrinking about 1-10% from its final position. Alternatively, a negative pressure or vacuum can be applied to cause the support 10 and the preforms thereon to shrink slightly. This shrinkage is sufficient to enable the mold die 38 to easily close. Die 38, like die 24, further includes a mold cavity 40 in the shape of the desired surface, here, for the outer panel of the door.

Once the mold dies are closed, the nozzle 36 supplies pressurized air from source 42 into the interior of the support 10 via opening 12. Thereafter, resin from source 28 is injected through grooves 30 into the mold to impregnate the fibrous preforms 14, 16 and 18. Air and excess resin is vented through the vent grooves 32. In this example, the resin is vinyl ester although polyester, epoxy, urethane, and other resins should prove to be acceptable. The thin walled support 10 is prevented from collapsing during the resin impregnation step by the counterbalancing air pressure in its interior provided by the pressurized source 42.

The mold remains closed until the resin cures and the resultant structure becomes rigid. Curing can be carried out under heat and pressure or can be done at room temperature depending upon the resin and its chosen catalyst. In this example, the mold dies are preferably heated to cure the resin impregnated in the preforms.

Figure 1:
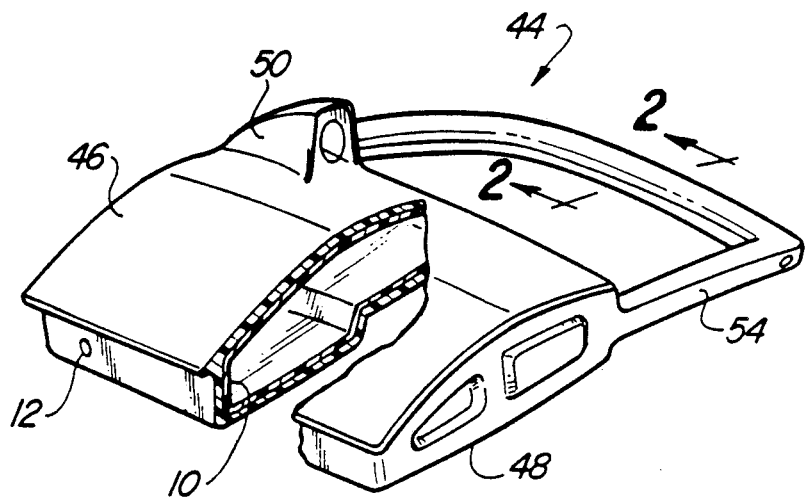
FIG. 1 is a perspective view with parts cut away of a part made in accordance with the teachings of the preferred embodiment of this invention.
Figure 2:
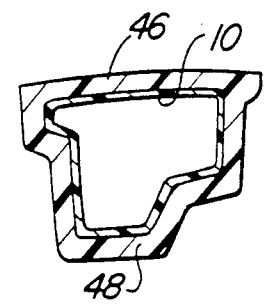
FIG. 2 is a cross-sectional view taken along the lines 2—2 of FIG. 1.

After the part is removed from the mold, it is trimmed as necessary to result in a one-piece molded door 44 as illustrated in FIGS. 1 and 2. Door 44 thus consists of an integrally molded unit containing an outer panel 46 integrally connected to the inner panel 48. The outer panel 46 includes a molded in mirror stalk 50. Intrusion beam, hinges, latch and other door hardware are preferably preassembled into a hardware module which can be inserted into the hollow cavity through an opening (not shown) which is either molded in or subsequently cut out after molding. The opening in the hollow cavity can be located either at the bottom of the door or in the hinge area. The module is designed to seal off this opening.

The one-piece molded door 44 thus eliminates the inefficiencies and costs of commonplace door constructions that require fabricating separate inner and outer panels and joining them together. The door 44 can provide the equivalent stiffness as a conventional metal door while using a material that has approximately 1/10 the modulus of steel. The one-piece door 44 also eliminates the number of pieces required for the door which, in turn, reduces assembly variations, increases productivity, reduces inventory and improves quality. The mold cavities 26 and 38 can be appropriately machined to provide the door with the desired surface finish. For example, mold cavity 26 can be textured to provide the inner panel with a grained trim surface while the mold cavity 40 will typically be smooth to provide the outer panel with the usually desired Class A surface. The present invention is particularly well suited for making complex, asymmetrical parts such as a vehicle door which includes a plurality of joints as, for example, where the window frame portion 54 of the door joins door cavity 52.

Various other advantages will become apparent to one skilled in the art after having the benefit of studying the specification, drawings and following claims.

What is claimed is:

1. In a method of forming a hollow fiber-reinforced part the improvement comprising:
   providing a hollow, one-piece, thin-walled, pressurizable support of sufficient rigidity to substantially maintain its shape;
   attaching a plurality of preforms of fibrous pieces directly to the support to form a subassembly;
   placing the subassembly in a mold;
   closing the mold, the support being sufficiently deformable to enable the mold to close easily;
   pressurizing the supports;
   impregnating the fibrous pieces with resin;
   curing the resin to form a hollow part;
   opening the mold; and
   removing the part from the mold.

2. The method of claim 1 which further comprises:

pressurizing the support while applying the preforms thereto;

depressurizing the support before the mold is closed; and repressurizing the support prior to impregnating the preforms with resin.

3. The method of claim 1 wherein the support is made by vacuum forming sheets of thermoplastic material having a thickness of between 0.010 and 0.030.

4. The method of claim 1 wherein the support defines a hollow interior of a vehicle door.

5. A method of forming a hollow fiber reinforced part, said method comprising:

providing a thin, hollow support which substantially has the shape of the desired part, said support having sufficient rigidity to substantially maintain its shape;

applying pressure to the interior of the support;

laying preforms of fibrous pieces on the exterior of support to form a subassembly;

pressurizing the support;

placing the subassembly into a mold;

closing the mold;

repressurizing the support;

injecting resin into the mold to impregnate the fibrous pieces;

curing the resin; and removing the part from the mold.

6. The method of claim 5 wherein said support is made by vacuum forming thermoplastic sheets having a thickness of 0.010 to 0.030 inch.

7. The method of claim 6 wherein said support is in the form of a vehicle door having a mirror stalk.

8. The method of claim 7 wherein said preforms surround the support so that the part removed from the mold provides a door with an outer panel integrally attached to an inner panel.

9. The method of claim 8 which further comprises:

trimming the part; and inserting door hardware into the interior of the support between the outer panel and inner panel.

10. A method of forming a vehicle door, said method comprising:

forming a thin, hollow support having a thickness of 0.010 to 0.030 inch which is substantially in the shape of a vehicle door including a mirror stalk;

applying a first preform to a top surface of the support to thereby generally define an outer panel for the door;

applying a second preform to the lower surface of the support to generally define an inner panel for the door;

applying a third preform to the mirror stalk portion of the support;

depressurizing the support;

placing the support and the preforms attached thereto into a mold;

closing the mold;

repressurizing the support;

injecting resin into the mold to impregnate the preforms;

curing the resin; and removing the part from the mold.

11. A molded vehicle door part comprising:

a unitary hollow structure having an integrally connected outer and inner panel both made of fiber reinforced material impregnated with essentially the same plastic resin, and a thin, one-piece, hollow, pressurizable support of sufficient rigidity to substantially maintain its shape defining interior portions of the door, the fiber reinforced material being attached directly to the support, and the support being constructed so that it is sufficiently deformable during mold closure to enable the mold to close easily.

12. The part of claim 11 wherein the thin support is a thermoplastic material about 0.010–0.030 inch thick.

* * * * *

UNITED STATES PATENT AND TRADEMARK OFFICE
CERTIFICATE OF CORRECTION

PATENT NO. : 5,000,990
DATED : March 19, 1991
INVENTOR(S) : Richard B. Freeman

It is certified that error appears in the above-identified patent and that said Letters Patent is hereby corrected as shown below:

Col. 4, line 63: "supports" should be --support--.

Col. 5, line 21: "pressurizing" should be --depressurizing--.

Signed and Sealed this

Nineteenth Day of October, 1993

Attest:

BRUCE LEHMAN

Attesting Officer    Commissioner of Patents and Trademarks